US006323456B1

(12) United States Patent
Murthy et al.

(10) Patent No.: US 6,323,456 B1
(45) Date of Patent: *Nov. 27, 2001

(54) METHOD OF FORMING AN INK JET PRINTHEAD STRUCTURE

(75) Inventors: Ashok Murthy; Tonya Harris Jackson; Steven Robert Komplin; Gary Raymond Williams, all of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,127

(22) Filed: May 11, 2000

Related U.S. Application Data

(60) Division of application No. 08/827,240, filed on Mar. 28, 1997, now Pat. No. 6,183,064, which is a continuation-in-part of application No. 08/519,906, filed on Aug. 28, 1995, now abandoned.

(51) Int. Cl.[7] ................................ B23K 26/38; B41J 2/14

(52) U.S. Cl. ........................................ 219/121.71; 347/47

(58) Field of Search ............................ 219/121.7, 121.71; 347/47; 216/27, 65

(56) References Cited

U.S. PATENT DOCUMENTS

| | | |
|---|---|---|
| 3,549,733 | 12/1970 | Caddell . |
| 3,656,988 | 4/1972 | Steffen et al. . |
| 4,044,222 | 8/1977 | Kestenbaum . |
| 4,169,008 | 9/1979 | Kurth . |
| 4,216,477 | 8/1980 | Matsuda et al. . |
| 4,239,954 | 12/1980 | Howard et al. . |
| 4,258,468 | 3/1981 | Balde . |
| 4,317,124 | 2/1982 | Shirato et al. . |
| 4,426,253 | 1/1984 | Kreuz et al. . |
| 4,472,238 | 9/1984 | Johnson . |
| 4,508,749 | 4/1985 | Brannon et al. . |
| 4,568,632 | 2/1986 | Blum et al. . |
| 4,587,534 | 5/1986 | Saito et al. . |
| 4,635,358 | 1/1987 | Fritz . |
| 4,642,160 | 2/1987 | Burgess . |
| 4,714,516 | 12/1987 | Eichelberger et al. . |

(List continued on next page.)

FOREIGN PATENT DOCUMENTS

| | | |
|---|---|---|
| 0 178 596 A2 | 10/1985 | (EP) . |
| 0 471 157 A1 | 2/1992 | (EP) . |
| 534414 A2 | 3/1993 | (EP) . |
| 0 564 103 A2 | 10/1993 | (EP) . |
| 0 576 007 A2 | 12/1993 | (EP) . |
| 0 719 642 A2 | 7/1996 | (EP) . |
| 0 759 362 A2 | 2/1997 | (EP) . |
| 0 761 448 A2 | 3/1997 | (EP) . |
| 2 241 186 A | 8/1991 | (GB) . |
| 58110190 | 6/1983 | (JP) . |
| 2-249652 | 10/1990 | (JP) . |
| 2-263653 | 10/1990 | (JP) . |

(List continued on next page.)

OTHER PUBLICATIONS

Impact™ Laser Processing System, Lumonics.

*Primary Examiner*—Geoffrey S. Evans
(74) *Attorney, Agent, or Firm*—Luedeka, Neely & Graham

(57) ABSTRACT

A method for making an inkjet printhead nozzle plate from a composite strip containing a nozzle layer and an adhesive layer is disclosed. The adhesive layer is coated with a polymeric sacrificial layer prior to laser ablating the flow features in the composite strip. A method is also provided form improving adhesion between the adhesive layer and the sacrificial layer. Once the composite strip containing the sacrificial layer is prepared, the coated composite strip is then laser ablated to form flow features in the strip in order to form the nozzle plates. After forming the flow features, the sacrificial layer is removed individual inkjet printhead nozzle plate are separated from the composite strip by singulating the nozzle plates with a laser.

32 Claims, 4 Drawing Sheets

U.S. PATENT DOCUMENTS

| | | |
|---|---|---|
| 4,770,740 | 9/1988 | Tsuzuki et al. . |
| 4,827,328 | 5/1989 | Ozawa et al. . |
| 4,829,319 | 5/1989 | Chan et al. . |
| 4,847,630 | 7/1989 | Bhaskar et al. . |
| 4,882,595 | 11/1989 | Trueba et al. . |
| 4,894,115 | 1/1990 | Eichelberger et al. . |
| 4,940,881 | 7/1990 | Sheets . |
| 4,948,645 | 8/1990 | Holzinger et al. . |
| 4,948,941 | 8/1990 | Altman et al. . |
| 4,959,199 | 9/1990 | Lantzer . |
| 5,061,840 | 10/1991 | Portney et al. . |
| 5,063,280 | 11/1991 | Isawaga et al. . |
| 5,163,177 | 11/1992 | Komura . |
| 5,208,604 | 5/1993 | Watanabe et al. . |
| 5,229,785 | 7/1993 | Leban . |
| 5,291,226 | 3/1994 | Schantz et al. . |
| 5,305,015 | 4/1994 | Schantz et al. . |
| 5,305,018 | 4/1994 | Schantz et al. . |
| 5,312,517 | 5/1994 | Ouki . |
| 5,350,616 | 9/1994 | Pan et al. . |
| 5,387,314 | 2/1995 | Baughman et al. . |
| 5,417,897 | 5/1995 | Asakawa et al. . |
| 5,463,413 | 10/1995 | Ho et al. . |
| 5,467,118 | 11/1995 | Gragg et al. . |
| 5,478,426 | 12/1995 | Wiler et al. . |
| 5,495,665 | 3/1996 | Carpenter et al. . |
| 5,505,320 | 4/1996 | Burns et al. . |
| 5,506,608 | 4/1996 | Marler et al. . |
| 5,594,479 | 1/1997 | Inoue et al. . |
| 5,648,805 | 7/1997 | Keefe et al. . |
| 5,656,229 | 8/1997 | Tanimoto et al. . |
| 5,703,631 | 12/1997 | Hayes et al. . |
| 5,818,478 | 10/1998 | Gibson . |
| 6,120,131 * | 9/2000 | Murthy et al. ......................... 347/47 |
| 6,183,064 * | 2/2001 | Murthy et al. ......................... 347/47 |

FOREIGN PATENT DOCUMENTS

| | | |
|---|---|---|
| 3-169559 | 7/1991 | (JP) . |
| 3-277554 | 12/1991 | (JP) . |
| 4-14458 | 1/1992 | (JP) . |
| 4-107149 | 4/1992 | (JP) . |
| 4-131244 | 5/1992 | (JP) . |
| 4-176655 | 6/1992 | (JP) . |
| 4-216946 | 8/1992 | (JP) . |
| 4-235048 | 8/1992 | (JP) . |
| 4-279355 | 10/1992 | (JP) . |
| 6-15829 | 1/1994 | (JP) . |
| 6-79874 | 5/1994 | (JP) . |
| 7-195697 | 8/1995 | (JP) . |
| WO 90/00459 A1 | 1/1990 | (WO) . |
| WO 93/22141 | 5/1993 | (WO) . |
| WO 95/11131 A1 | 4/1995 | (WO) . |

* cited by examiner

METHOD OF FORMING AN INK JET PRINTHEAD STRUCTURE

RELATED APPLICATIONS

This application is a division of U.S. patent application Ser. No. 08/827,240, now U.S. Pat. No. 6,183,604, filed Mar. 28, 1997, entitled "Method For Singulating and Attaching Nozzle Plates to Printheads," which is a Continuation-In-Part of U.S. patent application Ser. No. 08/519,906, filed Aug. 28, 1995, and entitled "A Method of Forming an Inkjet Printhead Nozzle Structure", now abandoned.

FIELD OF THE INVENTION

The present invention relates to inkjet printheads, and more particularly, to a method for laser ablating one or more nozzle holes and/or flow features in polymeric materials to form an inkjet printhead nozzle plate to the printhead.

BACKGROUND OF THE INVENTION

Printheads for inkjet printers are precisely manufactured so that the components cooperate with an integral ink reservoir to achieve a desired print quality. However, the printheads containing the ink reservoir are disposed of when the ink supply in the reservoir is exhausted. Accordingly, despite the required precision, the components of the assembly need to be relatively inexpensive, so that the total per page printing cost, into which the life of the assembly is factored, can be kept competitive in the marketplace with other forms of printing.

Typically the ink, and the materials used to fabricate the reservoir and the printhead, are not the greatest portion of the cost of manufacturing the assembly. Rather, it is the labor intensive steps of fabricating the printhead components themselves. Thus, efforts which lower the cost of producing the printhead have the greatest effect on the per page printing cost of the inkjet printer in which the printhead assembly is used.

One way to lower the cost of producing the printhead is to use manufacturing techniques which are highly automated. This saves the expense of paying highly skilled technicians to manually perform each of the manufacturing steps. Another important method for reducing costs is to improve the overall yield of the automated manufacturing process. Using a higher percentage of the printheads produced reduces the price per printhead by spreading out the cost of manufacture over a greater number of sellable pieces. Since process yields tend to increase as the number of process steps required to manufacture a part decrease, it is beneficial to reduce the number of process steps required to manufacture the printhead, or replace complex, low yield process steps with simpler, higher yield process steps.

Thermal inkjet printheads typically contain three and often less than about five major components, (1) a substrate containing resistance elements to energize a component in the ink, (2) an integrated flow features/nozzle layer or nozzle plate to direct the motion of the energized ink and (3) a flow channel layer for flow of the ink to the resistance elements. The individual features which must cooperate during the printing step are contained in the two major components, which are joined together before use.

Nozzle plates for inkjet printheads are formed out of a film of polymeric material that is provided on a reel. The nozzle plates are semicontinuously processed as film is unrolled from the reel. An important part of the process is the removal of individual nozzle plates from the film so that the plates may be attached to a semi-conductor chip surface for installation in the inkjet printhead. It is important that the removal process be conducted in a cost effective manner and that the quality of the resulting printhead structure be sufficient to achieve quality printed images.

In the past, an excimer laser was used to ablate the flow features and nozzle holes in a polymeric material to form nozzle plates and mechanical processes were used to cut the nozzle plates from the polymeric film. Mechanical punching is relatively inexpensive but is incapable of creating additional features on the nozzle plate that may be required for improving the adhesion between the nozzle plate and the semiconductor substrate to which it is attached. Mechanical punching also generates a significant quantity of debris which may interfere with the operation of the nozzle plate. It is also known that mechanical punches wear excessively at the corners and thus cannot achieve tight tolerances for any reasonable length of time, resulting in a high maintenance situation and a loss of product quality over time.

Typically, an adhesive is used to join the nozzle plates removed from the film to the printhead to provide a unitary structure. If the adhesive is applied to one of the nozzle plates or printheads before the manufacturing steps for that component are completed, then the adhesive layer may retain debris created during the various manufacturing steps. Often the debris is difficult to remove, and at the very least requires extra processing steps to remove, thus increasing the cost of the printhead. Additionally, if the debris is not completely removed the adhesive bond between the substrate and the nozzle layer will be impaired resulting in a printhead that either functions improperly or does not exhibit the expected utility lifetime.

If the adhesive is applied to one of the components after the features are formed in that component, additional labor intensive steps are required to ensure that the adhesive is positioned on the portions of the component that are to be used as bonding surfaces, and that the adhesive is removed from those portions of the component whose function will be inhibited by the presence of the adhesive. Not only do these extra steps add to the cost of the printhead, but any error in positioning the adhesive on the components will tend to reduce the yield of product from the printhead manufacturing process.

For example, if adhesive is left in a portion of the component such as a flow channel for the ink, then the proper function of that flow channel will be inhibited, and the printhead will be unusable. Alternately, if the adhesive does not adequately cover the bonding surfaces between the components, then the components may separate, allowing ink to leak from the completed assembly. Both of these conditions will lower the product yield, thereby increasing the cost of the printheads produced, as explained above.

It is an object of this invention, therefore, to provide a method for manufacturing an inkjet printhead that is highly automated.

It is another object of this invention to provide an inkjet manufacturing method that does not require additional process steps for the alignment and removal of adhesive.

It is a further object of this invention to provide a method for manufacturing an inkjet printhead in which the adhesive used to join the components does not attract and retain debris through subsequent process steps.

Another object of this invention is to provide a method for removing nozzle plates from a polymeric film.

A further object of the present invention is to provide a method of attaching a polymeric nozzle plate to a printhead.

SUMMARY OF THE INVENTION

The foregoing and other objects are provided by a method for making an inkjet printhead nozzle plate according to the present invention. In the present invention a composite strip containing a polymeric layer and optionally an adhesive layer is provided, and the adhesive layer is coated with a polymeric sacrificial layer. The coated composite strip is then laser ablated to form flow features comprising one or more nozzles, firing chambers and/or ink supply channels in the strip.

During the laser ablation step, slag and other debris created by laser ablating the composite strip adhere to the sacrificial layer, rather than to the adhesive layer. The sacrificial layer used to protect the adhesive layer during the laser ablation step is preferably a water soluble polymeric material, most preferably polyvinyl alcohol, which may be removed by directing jets of water at the sacrificial layer until substantially all of the sacrificial layer has been removed from the adhesive layer. Since the sacrificial layer is water soluble, it may readily be removed by a simple washing technique, and as a result of removal, will carry with it the debris adhered thereto. In this manner the nozzle structure is freed of the debris which may cause structural or operational problems without the use of elaborate cleaning processes. Furthermore, the adhesive may be applied directly to the nozzle structure before the nozzles are created by laser ablation, thus simplifying the manufacturing process.

A method is also provided for excising an inkjet printhead nozzle plate from the film of polymeric material by singulating, at least partially, all of the layers of the nozzle plate via use of a laser; subsequently removing the sacrificial layer. Once the nozzle plates are singulated and separated from the polymeric material, they are attached to a semiconductor substrate of an ink jet printhead.

BRIEF DESCRIPTION OF THE DRAWINGS

Further objects and advantages of the invention will become apparent by reference to a detailed description of preferred embodiments when considered in conjunction with the following illustrative drawings, in which like reference numerals denote like elements throughout the several views, and wherein.

DETAILED DESCRIPTION OF THE PREFERRED EMBODIMENTS

Figure 1:
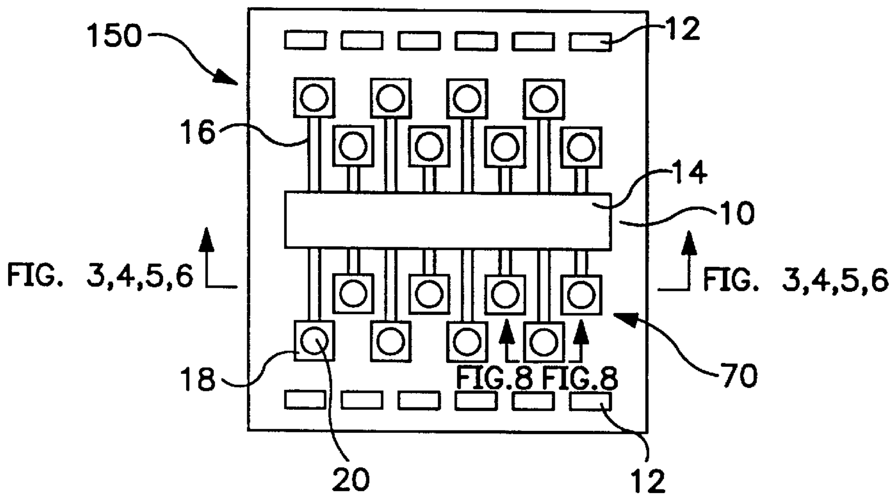
FIG. 1 is top plan view, not to scale, of a nozzle plate having flow features formed in a composite strip of polymeric material.

Referring now to the drawings, there is depicted in FIG. 1 a plan view, viewed from the semiconductor substrate side of the section 70 of a nozzle plate 150 showing the major features of the nozzle plate 150. The nozzle plate 150 is made from a polymeric material 10 selected from the group consisting of polyimide polymers, polyester polymers, polymethyl methacrylate polymers, polycarbonate polymers and homopolymers, copolymers and terpolymers as well as blends of two or more of the foregoing, preferably polyimide polymers, which has a thickness sufficient to contain firing chambers, ink supply channels for feeding the firing chambers and nozzles holes associated with the firing chambers. It is preferred that the polymeric material has a thickness of about 10 to about 300 microns, preferably a thickness of about 15 to about 250 microns, most preferably a thickness of about 35 to about 75 microns and including all ranges subsumed therein.

The material from which the nozzle plate 150 is formed is provided as a continuous elongate strip or film of polymeric material, from which many nozzle plates may be formed, one after another, in a continuous or semi-continuous process. To aid in handling and providing for positive transport of the elongate strip of polymeric material 10 through the manufacturing steps, sprocket holes or apertures 12 may be provided in the strip or film.

The flow features formed in the polymeric material 10 and the optional adhesive layer 24 to form the nozzle plates by processes that will be more fully described below include an ink supply channel 14, which receives ink from an ink reservoir (not shown) and supplies the ink to ink flow channels 16. The ink flow channels 16 receive the ink from the ink supply channel 14, and provide ink to the resistance elements (not shown) below the bubble chambers 18 which are also formed in the polymeric material 10 and the optional adhesive layer 24.

Upon energizing one or more resistance elements, a component of the ink is vaporized, creating a vapor bubble which imparts mechanical energy to a portion of the ink thereby ejecting the ink through a corresponding nozzle 20 of the nozzle plate 150. The ink exiting the nozzle 20 impacts a print medium, in a pre-defined pattern which becomes alpha-numeric characters and graphic images.

Figure 3:
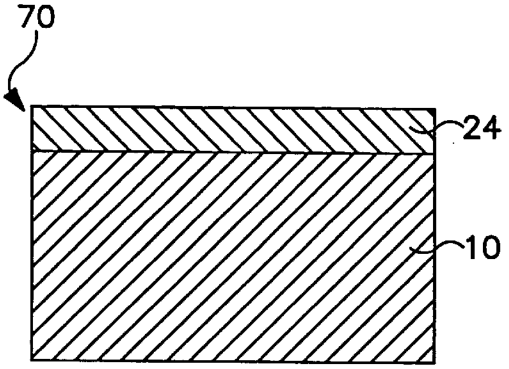
FIG. 3 is a cross-sectional view, not to scale, of a composite strip of polymeric material in which the nozzle plate is formed.
Figure 2:
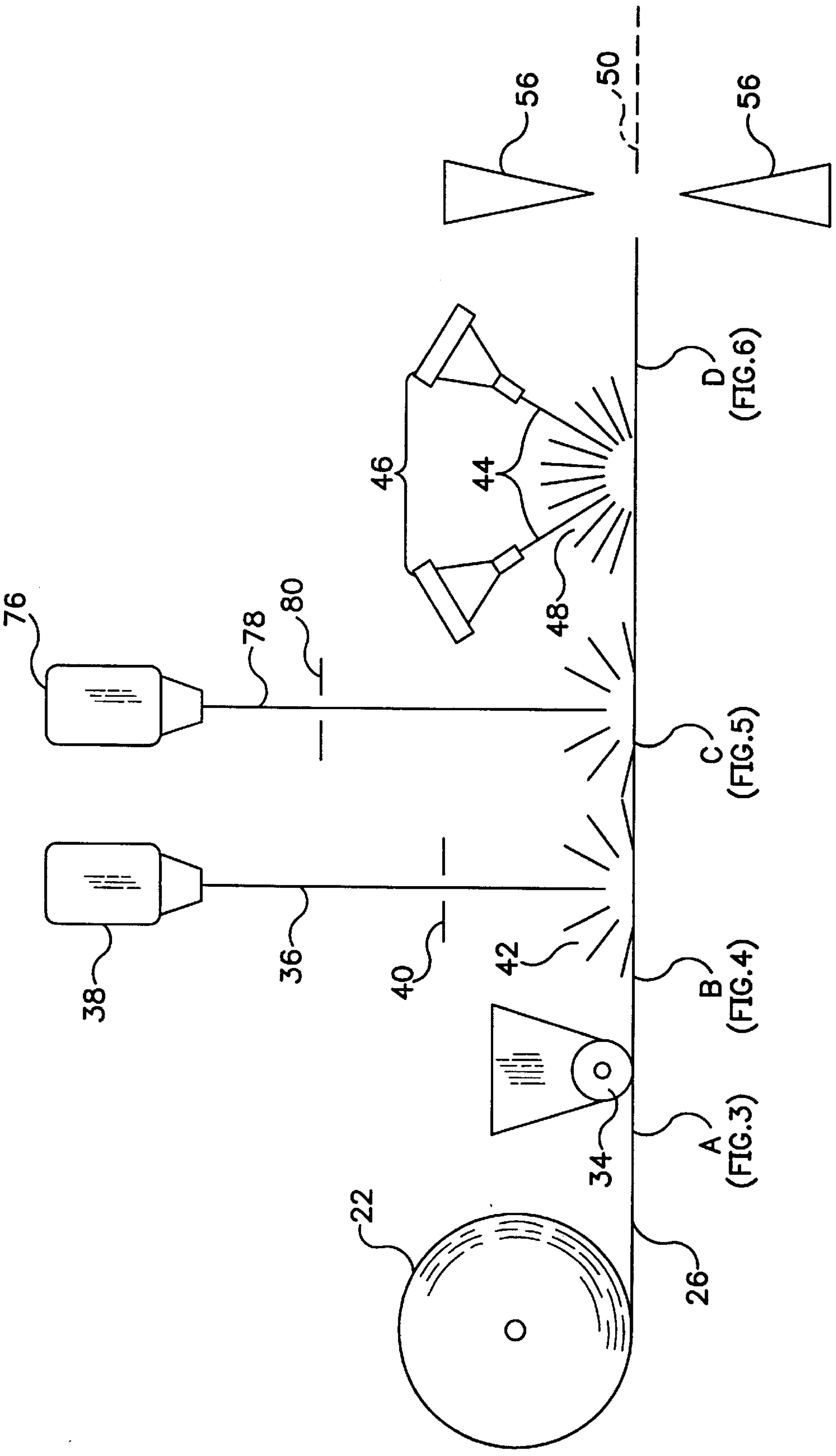
FIG. 2 is a diagrammatical representation of the manufacturing method for forming flow features in a nozzle plate.

The composite strip 26 of polymeric material 10 may be provided on a reel 22 to the nozzle plate formation process such as that schematically illustrated in FIG. 2. Several manufacturers, such as Ube (of Japan) and E.I. DuPont de Nemours & Co., of Wilmington, Del. commercially supply materials suitable for the manufacture of the nozzle plates under the trademarks of UPILEX or KAPTON, respectively. The preferred composite material 10 is a polyimide tape which contains an adhesive layer 24 as illustrated in FIG. 3.

The adhesive layer 24 is preferably any B-stageable adhesive material, including some thermoplastics. Examples of B-stageable thermal cure resins include phenolic resins, resorcinol resins, urea resins, epoxy resins, ethyleneurea resins, furane resins, polyurethanes, and silicon resins. Suitable thermoplastic or hot melt materials which may be used as adhesives include ethylene-vinyl acetate, ethylene ethyl acrylate, polypropylene, polystyrene, polyamides, polyesters, polyurethanes and preferably polyimides. The adhesive layer 24 is about 1 to about 100 microns in thickness, preferably about 1 to about 50 microns in thickness and most preferably about 5 to about 20 microns in thickness. In the most preferred embodiment, the adhesive layer 24 is a phenolic butyral adhesive such as that used in the laminate RFLEX R1100 or RFLEX R1000, commercially available from Rogers of Chandler, Ariz. At the position labeled "A" in FIG. 2, the composite strip 26 of polymeric material 10 and adhesive layer 24 has the cross-sectional configuration as shown in FIG. 3.

Figure 4:
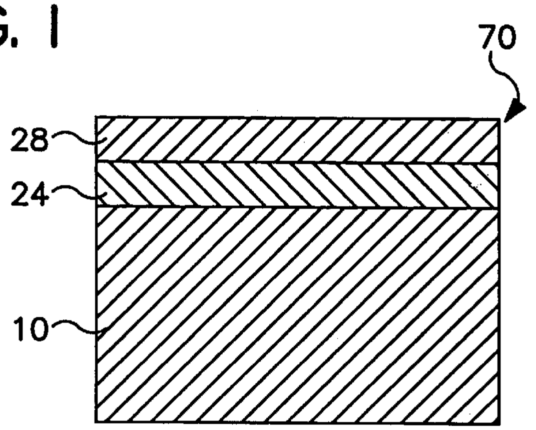
FIG. 4 is a cross-sectional view, not to scale, of a composite strip of polymeric material containing a sacrificial layer.

In order to protect the adhesive layer from debris during subsequent manufacturing steps, the adhesive layer 24 is temporarily protected with a sacrificial layer 28 as shown in FIG. 4. The sacrificial layer 28 is any polymeric material that may be applied in thin layers and is removable by a solvent that does not dissolve the adhesive layer 24 or the polymeric material 10. A preferred solvent is water, and polyvinyl alcohol is an example of a suitable water soluble sacrificial layer 28. Commercially available polyvinyl alcohol materials which may be used as the sacrificial layer include AIRVOL 165, available from Air Products Inc., of Allentown, Pa. and EMS1146 from Emulsitone Inc. of Whippany, N.J. as well as various polyvinyl alcohol resins from Aldrich. The sacrificial layer 28 is most preferably at least about 1 micron in thickness, and is preferably applied to the adhesive layer 24 by conventional techniques.

Methods for applying the sacrificial layer 28 to the adhesive layer 24 include dipping the composite strip 26 in a vessel containing the sacrificial layer material, spraying the sacrificial layer 28 onto the composite strip 26; printing such as by gravure or flexographic techniques the adhesive layer 24 with the sacrificial layer 28; coating by reverse gravure printing the adhesive layer 24 with the sacrificial layer 28; spinning the sacrificial layer 28 onto the adhesive layer 24; coating by reverse role coating or myer rod coating the adhesive layer 24 with the sacrificial layer 28; or knife coating or roll coating the adhesive layer 24 with the sacrificial layer 28.

A roll coating method for applying the sacrificial layer 28 to the composite strip 26 such as by coating roller 34 is shown in FIG. 2. At position B, the composite strip 26 now has a cross-sectional dimension as depicted in FIG. 4, with the adhesive layer 24 disposed between the polymeric material 10 and the sacrificial layer 28.

A method is also provided in the present invention for bonding the sacrificial layer 28 to the adhesive layer 24. The method includes the step of providing a composite strip 26 that contains the polymeric material 10 and the adhesive layer 24. At point A in the process (FIG. 2), composite strip 26 resembles that shown in FIG. 3. The sacrificial layer 28 is applied to the adhesive layer 24 by coating the adhesive layer 24 with the sacrificial layer 28.

Many of the conventional coating techniques may not provide a uniform, void-free coating of the sacrificial layer 28 on the adhesive layer 24. Since the presence of the sacrificial layer 28 is critical for removal of debris 42, the bond between the sacrificial layer 28 and the adhesive layer 24 must be sufficient to reduce significant delamination between the adhesive layer 24 and the sacrificial layer 28 during the early phases of laser ablation of the composite polymeric material 70. Delamination may occur when the sacrificial layer 28 has a low bonding strength. It has been found that the adhesion of the sacrificial layer 28 to the adhesive layer 24 can be improved significantly by post baking the composite strip 26 after coating the composite with the sacrificial layer 28 in a convection oven at a temperature ranging from about 60° C. to about 100° C. for a period of time ranging from about 30 minutes to about 60 minutes. In the alternative, the coated composite strip 26 may be baked by placing a heated roller in thermal proximity to the composite strip 26.

Figure 5:
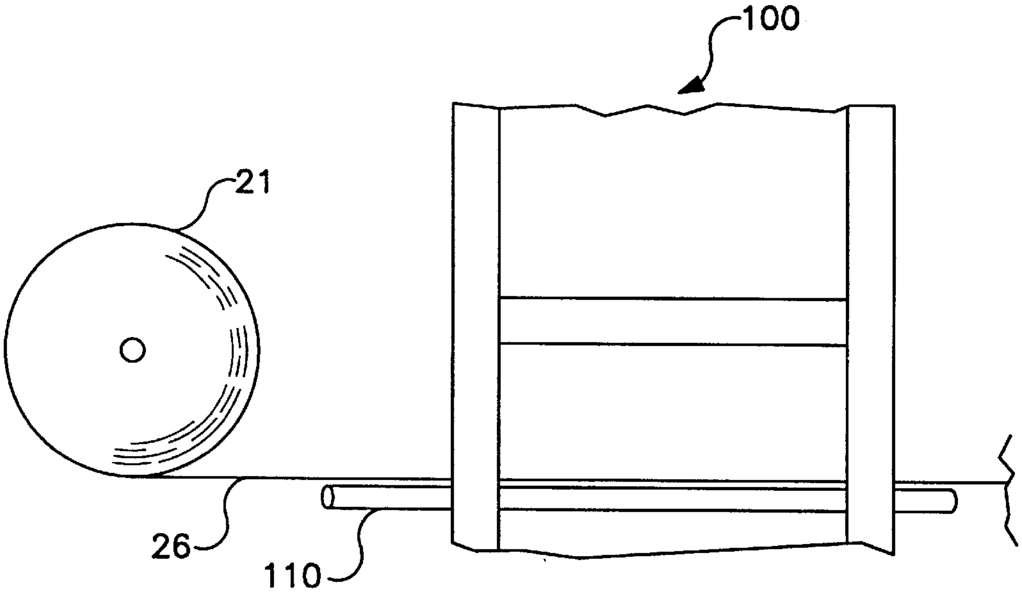
FIG. 5 is a side elevational view of a multi-zone heating oven used in the process of the invention.

As shown in FIG. 5, the preferred embodiment for baking the coated composite strip 26 is by use of a multi-zone heating oven 100. During the baking procedure in of the multi-zone oven 100, the composite strip 26 from reel 21 is fed through the multi-zone oven 100 by a conveyor apparatus 110. The multi-zone heating oven 100 has the following zones, zone temperatures, and approximate temperature ranges:

| Zone | Temperature | Temperature Range |
|---|---|---|
| 1 | 30° C. | 25° C.–35° C. |
| 2 | 60° C. | 45° C.–65° C. |
| 3 | 77° C. | 75° C.–85° C. |
| 4 | 95° C. | 90° C.–100° C. |
| 5 | 105° C. | 100° C.–110° C. |

In the preferred embodiment, the multi-zone heating oven 100 is 60 feet in length, and has a line speed of 15 feet per minute, which results in a total heating time of 4 minutes. Typically, the coating of the composite strip 26 and subsequent baking is performed before the composite strip 26 is rolled to form reel 22 containing the composite material. When the heated roller is applied to the coated composite strip 26 rather than the multi-zone heating oven 100, the composite strip 26 is preferably baked at a temperature from about 60° C. to about 100° C.

The flow features of the section 70 of the nozzle plate 150, such as ink supply channel 14, flow channels 16, bubble chambers 18, and nozzles holes 20 as depicted in FIG. 1, are preferably formed by laser ablating the composite strip 26 in a predetermined pattern. A laser beam 36 for creating flow features in the polymeric material 10 may be generated by a laser 38, such as an $F_2$, ArF, KrCl, KrF, or XeCI excimer or frequency multiplied YAG laser. Laser ablation of the flow features to form the section 70 of nozzle plate 150 of FIG. 1 is accomplished at a power of from about 100 millijoules per centimeter squared to about 5,000 millijoules per centimeter squared, preferably from about 150 to about 1,500 millijoules per centimeter squared and most preferably from about 700 to about 900 millijoules per centimeter squared, including all ranges subsumed therein. During the laser ablation process, a laser beam with a wavelength of from about 150 nanometers to about 400 nanometers, and most preferably about 248 nanometers, applied in pulses lasting from about one nanosecond to about 200 nanoseconds, and most preferably about 20 nanoseconds, is used.

Specific features of the nozzle plates 150 are formed by applying a predetermined number of pulses of the laser beam 36 through a mask 40 used for accurately positioning the flow features in the composite material 26. Many energy pulses may be required in those portions of the composite material 26 from which a greater cross-sectional depth of material is removed, such as the nozzles holes 20, and fewer energy pulses may be required in those portions of the composite material 26 which require that only a portion of the material be removed from the cross-sectional depth of the composite material 26 such as the flow channels 16, as will be made more apparent hereafter.

The boundaries of the features of the nozzle plate 70 are defined by the mask 40 which allows the laser beam 36 to pass through holes, transparent, or semitransparent regions of the mask 40 and inhibits the laser beam 36 from reaching the composite strip 26 in solid or opaque portions of the mask 40. The portions of the mask 40, which allow the laser beam 36 to contact the strip 26, are disposed in a pattern that corresponds to the shape of the features desired to be formed in the composite material 26.

During the laser ablation process of the composite strip 26 slag and other debris 42 are formed. At least a portion of the debris 42 may redeposit on the strip 26. In the present invention, since the top layer of the strip 26 contains the sacrificial layer 28, the debris 42 lands on the sacrificial layer 28 rather than on the adhesive layer 24.

If the composite strip 26 did not have the sacrificial layer 28, then the debris 42 would land on and/or adhere to the adhesive layer 24. Debris which lands on and adheres to the adhesive layer 24 is difficult to remove often requiring complicated cleaning procedures and/or resulting in unusable product. The present invention not only makes removal of the debris 42 easier, but also increases yield of nozzle plates due to a reduction in non-usable product.

Figure 6:
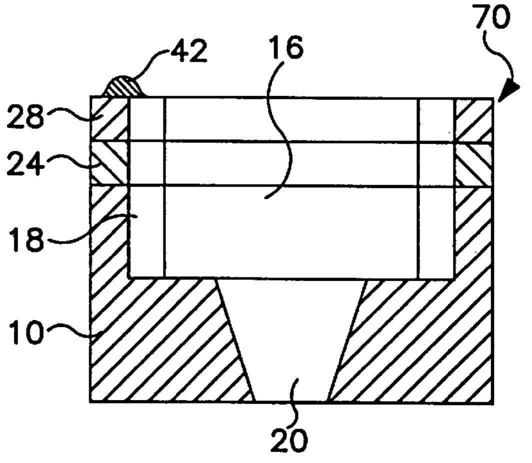
FIG. 6 is a cross-sectional view, not to scale, of the nozzle and firing chamber configuration in the composite strip of polymeric material after laser ablation of the flow features.

After the laser ablation of the composite strip 26 is completed, the section 70 of nozzle plate 150 at position C has the cross-sectional configuration shown in FIG. 6, as taken through one of the bubble chambers 18 and nozzle holes 20. As can be seen in FIG. 6, the polymeric material 10 still contains adhesive layer 24, which is protected by sacrificial layer 28. Debris 42 is depicted on the exposed surface of the sacrificial layer 28. The relative dimensions of the flow channel 16, bubble chamber 18, and nozzle 20 are also illustrated in FIG. 6.

Figure 8:
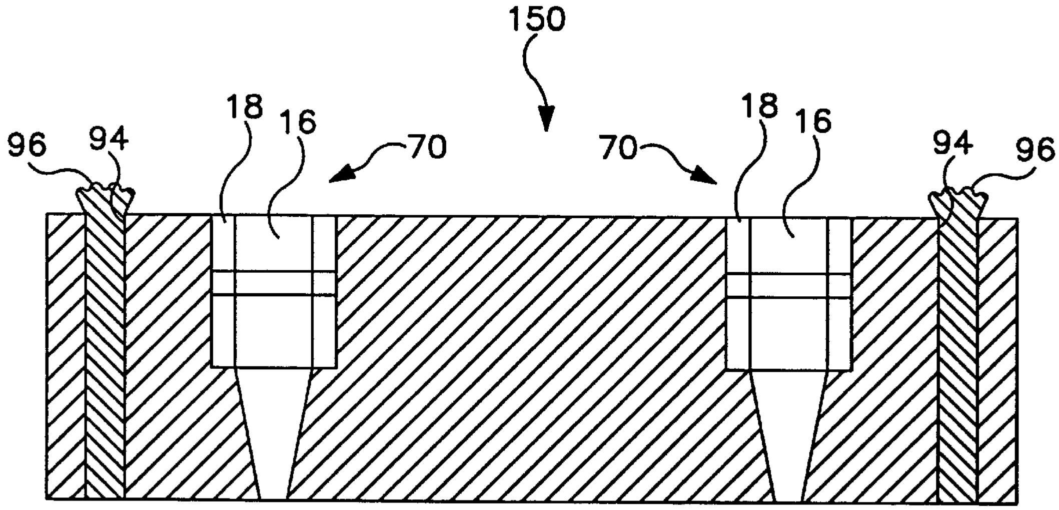
FIG. 8 is a cross-sectional view, not to scale, of the nozzle configuration in the composite strip of polymeric material after laser singulation of a nozzle plate.
Figure 7:
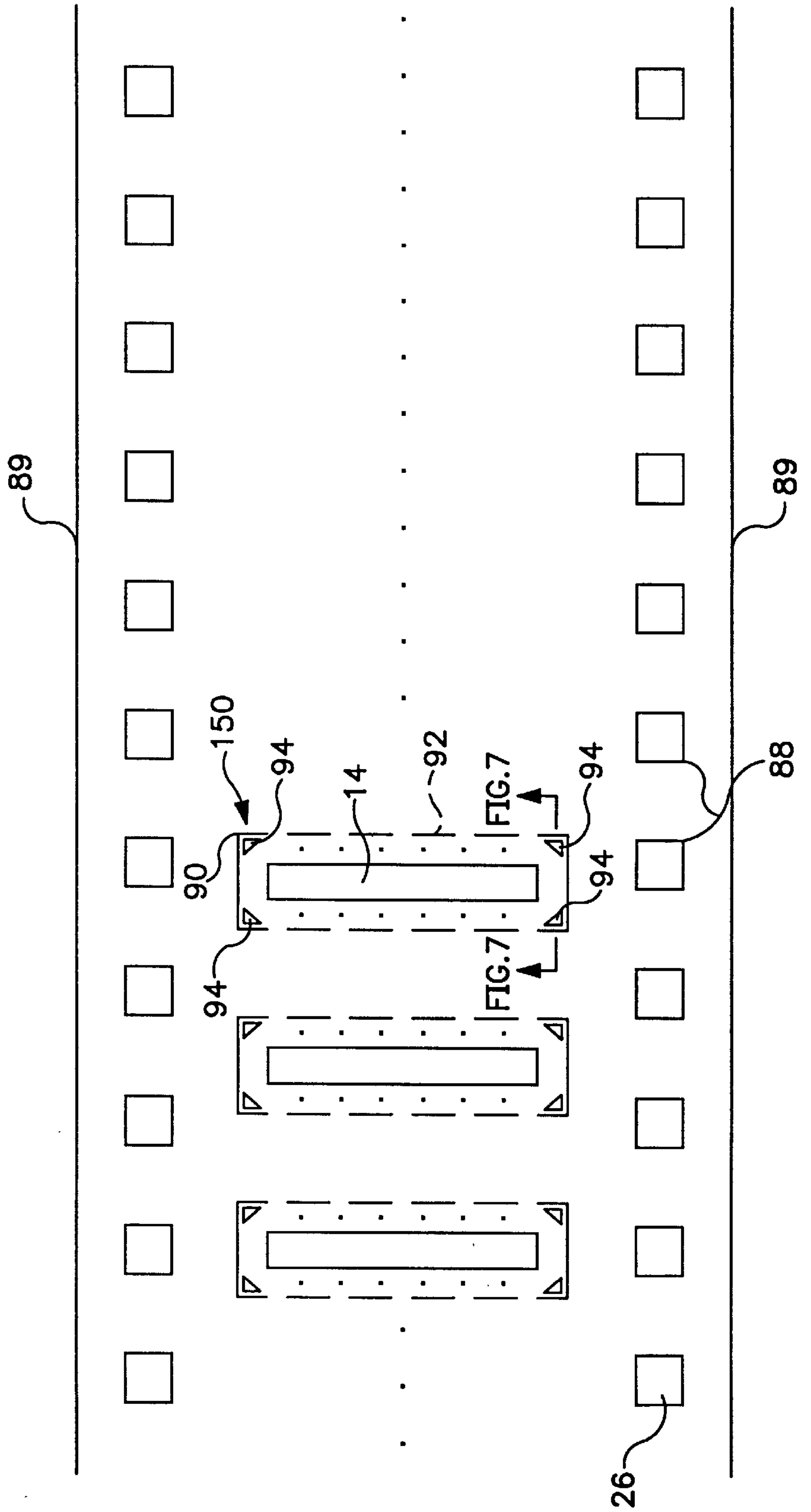
FIG. 7 is top plan view showing partial singulation of a plurality of nozzle plates in a film of polymeric material.

In the present invention, a method is also provided for increasing the bonding strength between the nozzle plate 150 and a silicon substrate (not shown). As shown in FIGS. 7 and 8, the method includes the step of forming triangular shaped apertures 94 adjacent to at least two of the four singulation corners 90 of the nozzle plate 150 by use of laser 76 (FIG. 2) to laser ablate the apertures 94. The apertures 94 extend through all layers of the strip 26.

Once each individual nozzle plate 150 is excised from strip 26 by the cutting blades 56 (FIG. 2), adhesive/glue is placed at the aperture locations. In the preferred embodiment, the adhesive 96 is an Ultra Violet (UV) curable adhesive. After being excised from strip 26 and the apertures 94 filled with adhesive 96, the individual nozzle plates 150 are positioned on a silicon substrate wafer (not shown). The adhesive 96 is cured via exposure of the silicon substrate to a UV light source. Once the silicon substrate wafer is fully populated with nozzle plates 150, individual substrates are separated from the silicon wafer and attached to a printhead.

A method is also shown in FIG. 2 for singulating and removing the inkjet printhead nozzle plates 150 from the laser ablated polymeric strip 26. In particular, the method includes the steps of providing a composite structure or strip 26 that contains a polymeric material 10, and as shown in FIG. 4, an adhesive layer 24, and a polymeric sacrificial layer 28. The method further includes the steps of partially laser singulating all layers of the nozzle plate 150 via laser 76 that is disposed subsequent to the excimer laser 38 in the process stream of FIG. 2. The method also includes the step of removing the nozzle plate 150 from the strip 26 via an excision cut using cutting blades 56.

The laser 76 used for partially singulating the nozzle plates may be selected from an infrared emitter type laser, a UV emitter-type laser like an excimer laser, a TEA $CO_2$ and a Q-switched YAG laser at primary wavelength or frequency multiplied. If the Q-switched YAG laser is used in the present invention, preferably the laser 76 will emit a wavelength of about 1.0 $\mu$m. Also preferably, the Q-switched YAG laser emits radiation onto the polymeric sacrificial layer 28 via laser beam 78 impulses lasting from about 8 nanoseconds to about 100 nanoseconds. The method for excising the inkjet printhead nozzle plate 70 from the reel of polymeric material 22 further includes a step of using an aperture plate 80 to shape the laser beam 78 of laser 76 so as to cut the polymeric sacrificial layer 28 at a width of about 0.005 inches.

In the preferred embodiment, the laser 76 is a TEA $CO_2$ laser. During the ablation process it is desired that heat dissipation around the singulated polymeric sacrificial layer 28 be limited to about 0 $\mu$m to about 37 $\mu$m from the cuts. It is understood that use of the aperture plate 80 to shape the laser beam of the TEA $CO_2$ laser to cut through all layers of the nozzle plate 70 at a width of about 0.005 inches, is also preferred, as with the use of the Q-switched YAG laser. The laser singulation of the polymeric sacrificial layer 26 is preferably performed at a speed of about 5 mm per second and greater by the TEA $CO_2$ laser.

Referring to FIG. 7, the composite strip 26, is moved along the plate shown in FIG. 2, by means of sprockets holes 88 that are disposed adjacent opposing edges 89 of the strip 26 on opposing sides of the nozzle plates 150. Singulation of the nozzle plates 150 is provided by laser 76 ablating through the sacrificial layer 28, adhesive layer 24, and polymeric material 10 to form slits 92 which are in a rectangular pattern around the perimeter of the nozzle plates 150.

The position of the slits 92 around the perimeter of the nozzle plates 150 are defined by projection mask 80, which allows the laser beam 78 to pass through apertures in the mask 80, and inhibits the laser beam 78 from reaching the composite strip 26 in other portions of the mask 80. The portions of the mask 80, which allow the laser beam 36 to contact the strip 26 are formed in set patterns.

Preferably, a galvo scanner, commercially available from General Scanning, Inc., of Chicago, Ill., is to be used to form the slits 92 and to cut corners 90 in each nozzle plate 150. As shown in FIG. 7, each slit on the composite strip 26 preferably extends through the sacrificial layer 28, adhesive layer 24, and polymeric material 10. The slits 92 in the composite strip 26 greatly aid in removal of each individual nozzle plate 150 using cutting blades 56.

When the sacrificial layer 28 is a water soluble material, removal of the sacrificial layer 28 and debris 42 thereon upon completion of the laser ablation steps is preferably accomplished by directing water jets 44 toward the strip 26 from water sources 46 (FIG. 2). Alternatively, the sacrificial layer 28 may be removed by soaking the strip 26 in a water bath for a period of time sufficient to dissolve the sacrificial layer 28. The temperature of the water used to remove the sacrificial layer 28 may range from about 20° C. to about 90° C. Higher water temperatures tend to decrease the time required to dissolve a polyvinyl alcohol sacrificial layer 28. The temperature and type of solvent used to dissolve the sacrificial layer 28 is preferably chosen to enhance the dissolution rate of the material chosen for use as the sacrificial layer 28.

The debris 42 and sacrificial layer 28 are contained in an aqueous waste stream 48 which is removed from the strip 26. Since the debris 42 was adhered to the sacrificial layer 28, removal of the sacrificial layer 28 also removed substantially all of the debris 42 formed during the laser ablation step. Because a water soluble sacrificial layer 28 is used, removal of the sacrificial layer 28 and debris 42 does not require elaborate or time consuming operations. Furthermore, the presence of the sacrificial layer 28 during the laser ablation process effectively prevents debris 42 from contacting and adhering to the adhesive layer 24. Because the method uses a sacrificial layer to protect the adhesive layer, the adhesive layer 24 may be attached to the polymeric material 10, rather than the substrate prior to laser ablation, thus simplifying the printhead manufacturing process.

Figure 9:
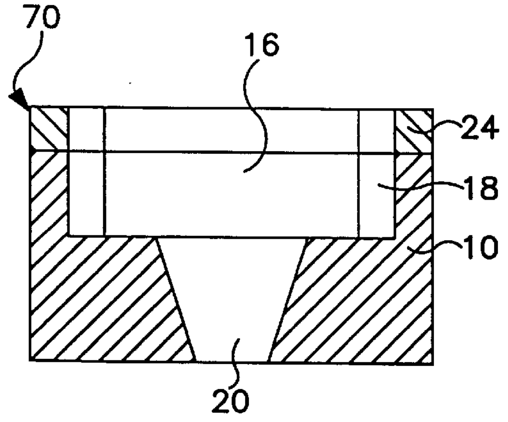
FIG. 9 is a cross-sectional view, not to scale, of the completed composite strip of polymeric material after removal of the sacrificial layer.

After removal of the sacrificial layer 28, the adhesive coated composite strip 26 at position D has a cross-sectional configuration illustrated in FIG. 9. As can be seen in FIG. 9, the structure contains the polymeric material 10 and the adhesive layer 24. The sacrificial layer 28 which previously coated the adhesive layer 24 has been removed.

Sections 50 containing individual nozzle plates 150 are separated one from another by cutting blades 56, and are then subsequently attached to silicon heater substrates. The adhesive layer 24 is used to attach the polymeric material 10 to the silicon substrate.

Prior to attachment of the polymeric material 10 to the silicon substrate, it is preferred to coat the silicon substrate with an extremely thin layer of adhesion promoter. The amount of adhesion promoter should be sufficient to interact with the adhesive of the nozzle plate 150 throughout the entire surface of the substrate, yet the amount of adhesion promoter should be less than an amount which would interfere with the function of the substrates electrical components and the like. The nozzle plate 150 is preferably adhered to the silicon substrate by placing the adhesive layer 24 on the polymeric material 10 against the silicon substrate, and pressing the nozzle plate 150 against the silicon substrate with a heated platen.

In the alternative, the adhesion promoter may be applied to the exposed surface of the adhesive layer 24 before application of the sacrificial layer 28, or after removal of the sacrificial layer 28. Well known techniques such as spinning, spraying, roll coating, or brushing may be used to apply the adhesion promoter to the silicon substrate or the adhesive layer. A particularly preferred adhesion promoter is a reactive silane composition, such as DOW CORNING Z6032 SILANE, available from Dow Corning of Midland, Mich.

It is also preferred to coat the substrate with a thin layer of photocurable epoxy resin to enhance the adhesion between the nozzle plate and the substrate before attaching the nozzle plate to the substrate and to fill in all topographical features on the surface of the chip. The photocurable epoxy resin is spun onto the substrate, and photocured in a pattern which defines the ink flow channels 16, ink supply channel 14 and firing chambers 18. The uncured regions of the epoxy resin are then dissolved away using a suitable solvent.

A preferred photocurable epoxy formulation comprises from about 50 to about 75% by weight gamma-butyrolactone, from about 10 to about 20% by weight polymethyl methacrylate-co-methacrylic acid, from about 10 to about 20% by weight difunctional epoxy resin such as EPON 1001F commercially available from Shell Chemical Company of Houston, Tex., from about 0.5 to about 3.0% by weight multifunctional epoxy resin such as DEN 431 commercially available from Dow Chemical Company of Midland Mich., from about 2 to about 6% by weight photoinitiator such as CYRACURE UVI-6974 commercially available from Union Carbide Corporation of Danbury and from about 0.1 to about 1% by weight gamma glycidoxypropyltrimethoxy-silane.

While preferred embodiments of the present invention are described above, it will be appreciated by those of ordinary skill in the art that the invention is capable of numerous modifications, rearrangements and substitutions of parts without departing from the spirit of the invention.

What is claimed is:

1. A method for making nozzle plates for an ink jet printer comprising the steps of:

(a) providing a composite strip containing a polymeric layer and an adhesive layer;

(b) coating the adhesive layer with a polymeric sacrificial layer;

(c) laser ablating the composite strip to form one or more nozzle holes and flow features therein; and (d) removing the sacrificial layer from the composite strip.

2. The method of claim 1 wherein the polymeric layer is selected from the group consisting of polyimide, polyester and polycarbonate materials.

3. The method of claim 1 wherein the polymeric layer is about 75 microns thick.

4. The method of claim 1 wherein the adhesive layer is selected from the group consisting of phenolics, resorcinols, ureas, epoxies, ethylene-ureas, furanes, polyurethans, silicones, ethylene-vinyl acetate, ethylene ethylacrylate, polypropylene, polystyrene, polyamindes, polyesters and polyurethanes.

5. The method of claim 4 wherein the adhesive layer is phenolic butyral.

6. The method of claim 1 wherein the sacrificial layer is soluble by a solvent that does not react with and dissolve the adhesive layer and polymeric layer.

7. The method of claim 6 wherein the sacrificial layer is a water soluble polymer.

8. The method of claim 7 wherein the sacrificial layer comprises polyvinyl alcohol.

9. The method of claim 7 further comprising removing the sacrificial layer from the composite strip by soaking the composite strip in water for a period of time sufficient to dissolve the sacrificial layer.

10. The method of claim 7 further comprising removing the sacrificial layer from the composite strip by directing jets of water at the sacrificial layer until the sacrificial layer is substantially removed from the adhesive layer.

11. The method of claim 1 wherein the sacrificial layer is at least about 1 micron thick.

12. The method of claim 1 wherein the laser ablation is accomplished with a laser selected from the group consisting of excimer and frequency multiplied YAG lasers.

13. The method of claim 1 wherein the laser ablation is accomplished at a power ranging from about 100 millijoules per centimeter squared to about 5,000 millijoules per centimeter squared.

14. The method of claim 1 wherein the laser ablation is accomplished at a wavelength ranging from about 150 nanometers to about 400 nanometers.

15. The method of claim 1 wherein the laser ablation is accomplished by applying laser energy in pulses lasting from about one nanosecond to about 200 nanoseconds.

16. A method of attaching the nozzle member formed by the method of claim 1 to a silicon substrate comprising the steps of:

applying an adhesion promoter to the silicon substrate, and attaching the nozzle member to the silicon substrate by placing the adhesive layer against the silicon substrate, and pressing the nozzle member against the silicon substrate with a heated platen.

17. A method for making an inkjet printhead nozzle member comprising the steps of:

providing a composite strip containing a polymeric layer and an adhesive layer;

coating the adhesive layer with a polymeric sacrificial layer;

laser ablating the composite strip to form one or more flow features therein; and removing the sacrificial layer from the composite strip.

18. The method of claim 17 wherein the polymeric layer is selected from the group consisting of polyimide, polyester and polycarbonate materials.

19. The method of claim 17 wherein the polymeric layer is at least about 75 microns thick.

20. The method of claim 17 wherein the adhesive layer is selected from the group consisting of phenolics, resorcinols, ureas, epoxies, ethylene-ureas, furanes, polyurethanes, silicones, ethylene-vinyl acetate, ethylene ethylacrylate, polypropylene, polystyrene, polyamides, polyesters, and polyurethanes.

21. The method of claim 20 wherein the adhesive layer is phenolic butyral.

22. The method of claim 17 wherein the sacrificial layer is soluble by a solvent that does not react with and dissolve the adhesive layer and polymeric layer.

23. The method of claim 22 wherein the sacrificial layer is a water soluble polymer.

24. The method of claim 22 wherein the sacrificial layer comprises polyvinyl alcohol.

25. The method of claim 22 further comprising removing the sacrificial layer from the composite strip by soaking the composite strip in water for a period of time sufficient to dissolve the sacrificial layer.

26. The method of claim 23 further comprising removing the sacrificial layer from the composite strip by directing jets of water at the sacrificial layer until the sacrificial layer is substantially removed from the adhesive layer.

27. The method of claim 17 wherein the sacrificial layer is at least about 1 micron thick.

28. The method of claim 17 wherein the laser ablation is accomplished with a laser selected from the group consisting of excimer and frequency multiplied YAG lasers.

29. The method of claim 17 wherein the laser ablation is accomplished at a power ranging from about 100 millijoules per centimeter squared to about 5,000 millijoules per centimeter squared.

30. The method of claim 17 wherein the laser ablation is accomplished at a wavelength ranging from about 150 nanometers to about 400 nanometers.

31. The method of claim 17 wherein the laser ablation is accomplished by applying laser energy in pulses lasting from about one nanosecond to about 200 nanoseconds.

32. A method of attaching the nozzle member formed by the method of claim 17 to a silicon substrate comprising the steps of:

applying an adhesion promoter to the silicone substrate, and attaching the nozzle member to the silicon substrate by placing the adhesive layer against the silicon substrate, and pressing the nozzle member against the silicon substrate with a heated platen.

* * * * *